United States Patent [19]

Röhm

[11] Patent Number: 4,623,155
[45] Date of Patent: Nov. 18, 1986

[54] DRILL CHUCK WITH RADIAL JAWS

[76] Inventor: Günter H. Röhm, Heinrich-Röhm-Str. 50, D-7927 Sontheim, Fed. Rep. of Germany

[21] Appl. No.: 678,343

[22] Filed: Dec. 5, 1984

[30] Foreign Application Priority Data

Dec. 22, 1983 [DE] Fed. Rep. of Germany ....... 3346440

[51] Int. Cl.[4] ............................................. B23B 31/12
[52] U.S. Cl. ...................................... 279/19; 279/110; 279/114; 279/123
[58] Field of Search .................... 279/114, 110, 61, 62, 279/60, 9 R, 123, 1 R, 19, 19.1, 19.2, 19.3, 19.4, 19.5, 19.6, 19.7; 408/239 R, 239 A, 240

[56] References Cited

U.S. PATENT DOCUMENTS 3,028,167  4/1962  Werstein ............................... 279/19

FOREIGN PATENT DOCUMENTS 515505  1/1931  Fed. Rep. of Germany ...... 279/114

Primary Examiner—William R. Briggs
Attorney, Agent, or Firm—Karl F. Ross; Herbert Dubno

[57] ABSTRACT

A drill chuck for a hammer drill apparatus or the like having a plurality of clamp jaws advanceable to and retractable from a chuck drill axis so as to be able to grasp and hold a drill, wherein each of the clamp jaws is advanced into and retracted from a chuck opening in the chuck in a feed channel directed toward, and preferably perpendicular to, the chuck drill axis and further oriented so that the clamp jaws engage and hold the drill in the chuck opening when advanced in the channels, each of the feed channels being conformed so that each of the clamp jaws fits movably, but sufficiently tightly, therein so that drilling dirt does not penetrate between the clamp jaws and the surfaces of the feed channels, and the drill chuck is provided with a plurality of open cleaning passages connecting the interior wall of the chuck opening adjacent a mouth of one of the feed channels to the outside through the chuck. Additionally so that limited axial play and efficient hammer action may be obtained, the clamping surfaces of the chuck jaws are each provided with a row of projections parallel to the drill chuck axis.

10 Claims, 6 Drawing Figures

DRILL CHUCK WITH RADIAL JAWS

FIELD OF THE INVENTION

My present invention relates to a drill chuck and, more particularly, to a drill chuck for a hammer drilling apparatus, the chuck having clamp jaws advanceable toward and retractable away from the drill chuck axis and positioned within a chuck body having an opening coaxial with the chuck axis for clamping and holding a drill in the chuck opening.

BACKGROUND OF THE INVENTION

In drill chucks, especially hammer drill chucks, it is desirable to be able to grasp the drill between the clamp jaws so that it is, of course, firmly held rotatably (i.e. without play) and can be fed axially securely and reliably, but is still capable of a comparatively small axial play, in order that the hammer impact provided by a driver apparatus can be most effectively applied to the drill.

In the usual drill chuck with conically shaped clamp jaws which are displaced at an inclination to the chuck axis this can be accomplished only with difficulty.

In such prior art drill chucks there is also a danger of fouling or contamination by borings and cuttings, especially in the spaces around the drill in the drill chuck.

The contamination or drilling detritus can build up until the clamp jaws are jammed shut in their forward position so that the drill chuck must be dismounted often and cleaned. A build-up of drilling dirt will also adversely affect the drilling in other ways including the quality as well as the speed of drilling. The problem is most severe in overhead drilling and where pockets are formed around the jaws at the guide channels therefor.

OBJECTS OF THE INVENTION

The general object of this invention is to provide an improved drill chuck, especially for hammer drills in which the clamp jaws can lock the tool against rotation without play but some slight axial play is available and the advance and retraction of the clamp jaws is accomplished without problems due to the previously described fouling or contamination.

It is a further object of this invention to provide an improved drill chuck which is not easily contaminated by cuttings and borings formed during the drilling process.

It is also an object of my invention to provide an improved drill chuck which does not need to be frequently dismounted and cleaned due to build-up of drilling waste due to cuttings, borings and the like formed during drilling.

It is yet another object of the present invention to provide a drill chuck in which the axial play makes it possible for the impact of the ram to be fully utilized by the drill, but which is not contaminated by cuttings, borings and the like formed in the drilling operation.

SUMMARY OF THE INVENTION

These objects and others which will become apparent hereinafter are attained in accordance with the invention in a drill chuck having clamp jaws advanceable toward and retractable from the drill chuck axis in a direction perpendicular thereto and thus radially thereof. The clamp jaws are positioned interiorly in a drill chuck opening coaxial with the drill chuck axis for clamping and holding a drill in the chuck opening of the drill chuck.

According to the invention the clamp jaws are advanced toward and retracted from the drill chuck axis in radially directed, closed feed or jaw channels having mouths opening into the chuck opening of the drill chuck.

A plurality of open cleaning passages, extending through the drill chuck for removing drilling dirt and the like, connect exit ports in the chuck opening positioned between the mouths of adjacent feed channels or in mouth edges formed by the intersection of two adjacent feed channels through the chuck to the outside. Preferably each pair of adjacent feed channels has an open cleaning passage therebetween and the open cleaning passages are perpendicular to the drill chuck axis, i.e. are radially directed. With the chuck of the invention the advance and retraction of the clamp jaws does not involve any axial displacement of the clamp jaws in contrast to the partially axial advance and retraction of the clamp jaws in prior art chucks. The feed channels are shaped so that the clamp jaws fit tightly therein, but movably, so the drilling dirt cannot penetrate between the clamp jaws and the channels.

According to an important feature of the invention the desired axial free play of the drill in the clamp jaws is provided by gripping of the drill between the projections of the clamp jaws which run parallel to the chuck axis. This play is thus provided to the drill in a simple manner, while rotatable operation and secure axial movement of the drill with the chuck are also assured.

The projections of the clamp jaws either grip axially extending recesses or channels provided in the shaft of the drill, as for example is taught in German patent document DE-GM 81 32 988, or the clamp jaws dig into the drill shaft at points unimportant to the drill operation and thus create self fitting recesses in the drill shaft.

Furthermore the clamp jaw feed is made secure against contamination by simply enclosing the circular cross section radially disposed feed channels adjacent the drill-receiving opening provided in the chuck.

Of course, the channels to the chuck opening can have an open pocket in the vicinity of the mouth of the channel between the flanking surfaces of the projections on the clamp jaws and the wall of the channel, so long as the clamp jaws are not extended to their fullest limit into the chuck opening. However, retention of drilling dirt in these pockets is prevented by the detritus-clearing ports or passages terminating at the mouth edges of the channels during drilling. Through these ports the drilling scraps are successfully removed from these pockets and are transported through the cleaning passages to the outside by centrifugal force.

A preferred specific embodiment of the invention, in which the drill chuck has at least three chuck jaws distributed about the periphery of the chuck, is particularly characterized by the cleaning passages, each arranged between an adjacent pair of feed channels and partially penetrating the mouths of both neighboring channels forming an exit port. The exit ports of the cleaning passages in the mouth edges have a cross-section that mutually penetrates the mouths of adjacent feed channels in the preferred embodiment.

In a two-jaw drill chuck, the feed channels are connected to a circumferentially running circular groove about the interior wall of the chuck opening, in which the exit port is located in or between the mouth edges of adjacent channels and the cleaning passages is connected to the exit port.

In the preferred embodiment the clamp jaws and the feed channels have a circular cross-section transverse to the feed direction.

BRIEF DESCRIPTION OF THE DRAWING

The above and other objects, features and advantages of the invention will become more readily apparent from the following detailed description, reference being made to the accompanying drawing, in which.

SPECIFIC DESCRIPTION

Figure 2:
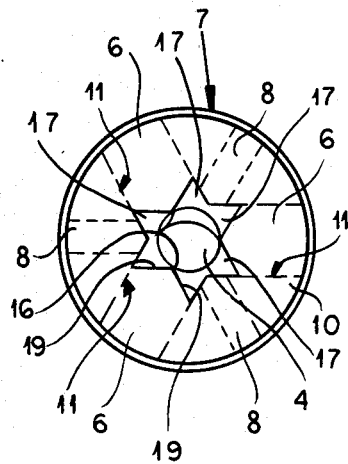
FIG. 2 is a front view of the drill chuck of FIG. 1 showing the chuck opening.

The drill chucks shown in the drawing in which the same reference numerals with different letter designations are used to represent similarly functioning parts have a chuck body 1, 1a coupled to an unshown drill spindle driven by an unshown drilling apparatus. On the side of the chuck body 1 opposite that in which the drill or tool T is inserted the chuck body 1, 1a is provided with a central cavity 2, 2a. A chuck opening 4, 4a, 4b coaxial with the drill chuck is provided in the chuck for the drill and axially connects with the chuck cavity 2, 2a. It is therefore possible to communicate the impact effect of the hammer H directly or indirectly to the end of the drill T. The clamp jaws 6, 6a, 6b hold the drill and are advanced and retracted in feed channels 11, 11a, 11b by means of rotatable, but axially unshiftable, support ring 7, 7a, 7b. This support ring 7 is coaxial with chuck body 1, and provided with a cover ring 10 on the drill side front surface of support ring 7.

The clamp jaws 6, 6a, 6b are fed in the radially directed feed channels 11, 11a, 11b toward and away from the chuck opening 4.

The chuck body 1 bears on its front side turned toward the support ring 7 a planar spiral thread groove 12, the pitch of thread groove 12 fitting the corresponding spiral, planar thread teeth 13 on the clamp jaws 6 to provide a means for advancing and retracting the clamp jaws 6.

The channels 11, 11a, 11b have a preferably circular cross section perpendicular to their clamp jaw feed direction, excepting in the region of the spiral toothing 13. The circular inner thread tooth 14 of the clamp jaws 6 has been provided with a greater height in the axial direction than the other thread teeth 13. The inner thread tooth 14 works hence as a closure for the channel even in the radially most advanced position of the clamp jaw 6 for which it forms a stop.

Figure 1:
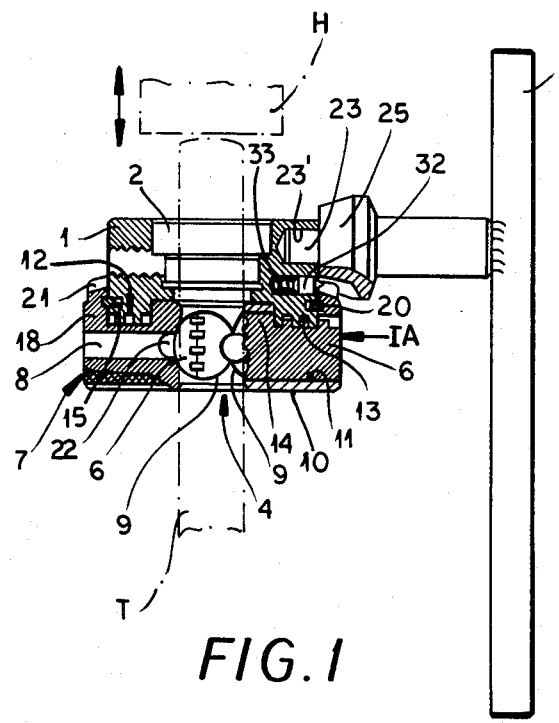
FIG. 1 is an axial cross-section through a drill chuck according to a first and best-mode embodiment of the invention in which the drill chuck has three clamp jaws.
Figure 1A:
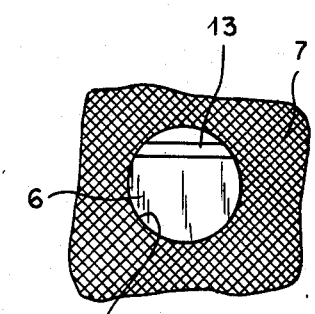
FIG. 1A is a view of the region IA in FIG. 1.

FIG. 1 shows the largest gripping diameter of the clamp jaws which occurs when the clamp jaws 6 are substantially flush radially with the support ring 7.

The width of the innermost thread 14 is at least equal radially to the difference between the smallest and largest gripping diameters of the clamp jaws 6. In this way this innermost thread tooth 14 covers the feed channel 11 to chuck opening 4, thus enclosing the clamp jaws 6 at least partially, even in the most radially advanced position corresponding to the smallest gripping diameter.

Additionally the support ring 7 is provided with a collar 18 which encloses the cylindrical outer surface of the chuck body 1 and holds the chuck body 1 to the support ring 7.

To secure the support ring 7 against axial motion relative to chuck body 1, the spring ring 20 is disposed in a groove 15 and extending radially between and partially in chuck body 1 at its periphery and the collar 18 of support ring 7, the groove 15 having a radial depth sufficient to receive the ring for mounting and dismounting the support ring 7. When washer 20 is mounted in washer canal 15 it is compressed until the washer 20 completely fills the groove of washer canal 15 of chuck body 1. This allows the support ring to be removed or fitted onto the chuck. The compression of ring 20 can be effected in any conventional way.

At its rear edge along the collar 18 the support ring 7 is provided with a conical crown gear 21. The chuck body 1 is provided with a radial guide cavity 23' for the feed post 23 of a tightening key 24, which bears a bevel pinion 25, that engages in the outer gear 21 of the support ring 7 for tightening and loosening support ring 7 by tightening key 24. In addition the support ring 7 can be secured against self-loosening of the fastened drill by lock pin 32 which is fed radially in the chuck body 1 and is pressed outwardly toward the gearing 21 of support ring 7 by spring 33 to engage between teeth thereof until pressed inwardly by the key 24.

Figure 5:
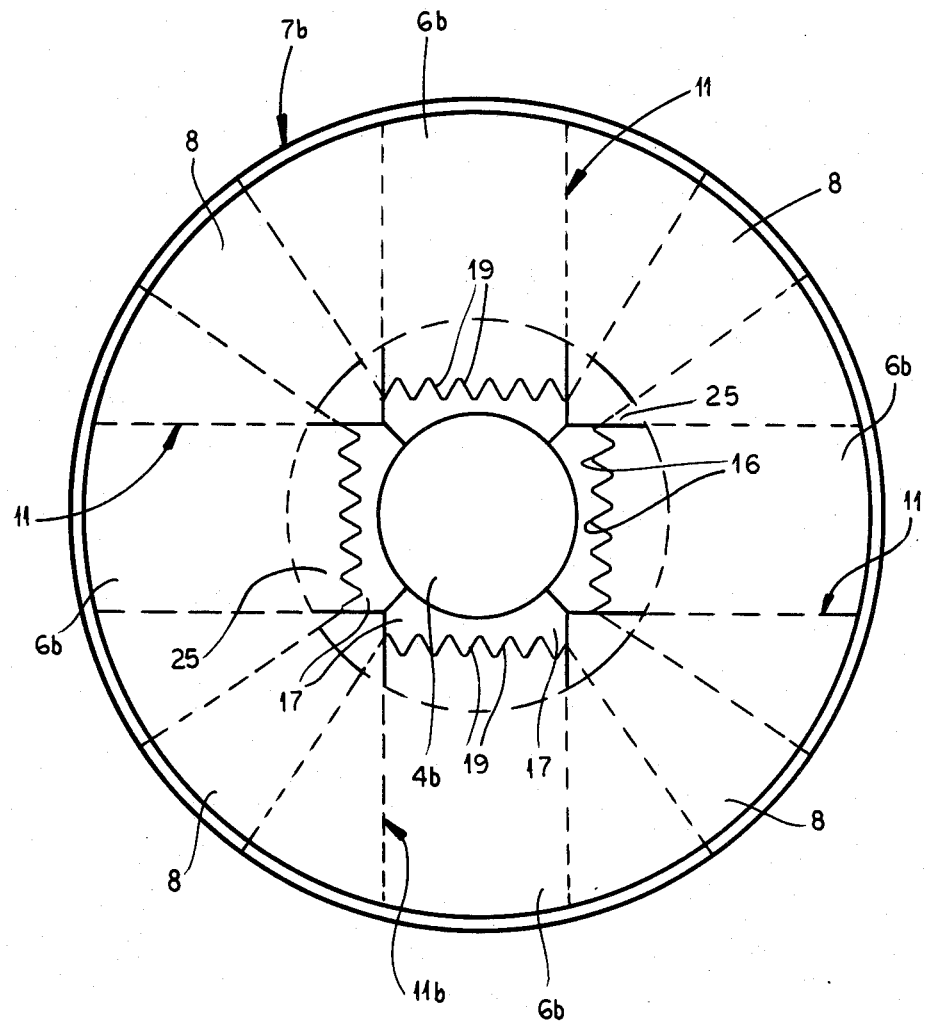
FIG. 5 is a front view of a drill chuck according to a third embodiment of the invention having four clamp jaws.

The clamp jaws 6 are each provided on their clamping surfaces with a row of projections 16 running parallel to the chuck axis. Each row contains a plurality of projections spaced preferably equidistant from each other, which are preferably shaped like the teeth of a saw. Open pockets 17 can exist between the flanking surfaces 19 between these projections 16 and the wall of the channel 11, as long as the clamp jaws 6 are not advanced completely from the channels 11 to their fullest extent. To prevent drilling waste sediment disturbed by the drilling operation from building up in the pockets 17, open cleaning passages 8 running through the drill chuck radially connect exit ports 22 provided in the mouth edges 9 at the mouths of adjacent channels 11 to the outside as shown in FIGS. 1, 2 and 5.

Figure 3:
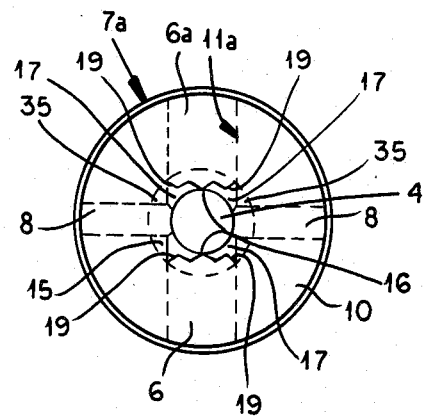
FIG. 3 is a front view of a second embodiment of the drill chuck in which the drill chuck has two clamp jaws.
Figure 4:
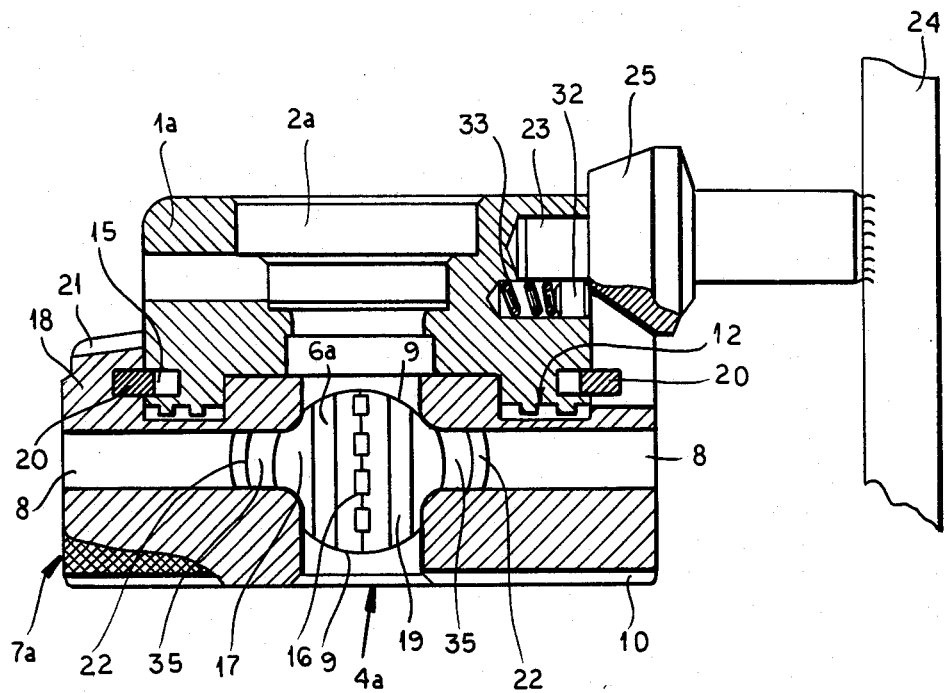
FIG. 4 is an axial section through the drill chuck of FIG. 3.

In a three-jaw drill chuck and four-jaw chuck, the cleaning passages 8 are positioned between two feed channels 11. These cleaning passages 8 penetrate the mouths of both neighboring channels 11, whereby the exit ports 22 in mouth edges 9 correspond to a mutual cross section penetrating through both the adjacent channels 11 and the cleaning passages 8. In the two-jaw drill chuck shown in FIGS. 3 and 4 the channels 11 are joined to a circumferential circular groove 35 in the wall of chuck opening 4 parallel to the chuck axis. The exit ports 22 of cleaning passages 8 are also provided in circular groove 35 between adjacent feed channels 11.

I claim:

1. In a drill chuck especially for a hammer drill apparatus having a plurality of clamp jaws advanceable toward and retractable away from a chuck drill axis so as to be able to grasp and hold a drill, the improvement wherein:

each of said jaws is advanced into and retracted from a chuck opening in said chuck in a feed channel oriented generally radially with respect to said chuck drill axis and further oriented so that said jaws engage and hold said drill in said chuck opening when advanced in said channels;

each of said feed channels is circumferentially closed at least adjacent said chuck opening and configured so that each of said clamp jaws fits movably, but sufficiently tightly in the respective feed channels so that borings and cuttings cannot penetrate between the surfaces of said channels and said clamp jaws; and said drill chuck is provided with a plurality of open cleaning passages, each of said cleaning passages connecting the interior wall of said chuck opening adjacent a mouth of one of said feed channels to the outside through said chuck.

2. In a drill chuck especially for a hammer drill apparatus having a plurality of clamp jaws advanceable toward and retractable away from a chuck drill axis so as to be able to grasp and hold a drill, the improvement wherein:

each of said jaws is advanced into and retracted from a chuck opening in said chuck in a feed channel oriented generally radially with respect to said chuck drill axis and further oriented so that said jaws engage and hold said drill in said chuck opening when advanced in said channels;

each of said jaws is provided with at least one drill-engaging formation extending parallel to said axis and affording limited axial play of a drill engaged by said jaws;

each of said feed channels is circumferentially closed at least adjacent said chuck opening and configured so that each of said clamp jaws fits movably, but sufficiently tightly in the respective feed channels so that borings and cuttings cannot penetrate between the surfaces of said channels and said clamp jaws; and said drill chuck is provided with a plurality of open cleaning passages, each of said cleaning passages connecting the interior wall of said chuck opening adjacent a mouth of one of said feed channels to the outside through said chuck.

3. The improvement defined in claim 2 wherein a plurality of projections are arranged and attached in at least one row parallel to said chuck drill axis on clamping surfaces of said chuck jaws to provide said formations.

4. The improvement defined in claim 3 wherein said projections on said clamping surfaces are saw-tooth shaped.

5. The improvement defined in claim 2 wherein said feed channels are positioned sufficiently close to one another and are of a sufficient size so that each of said cleaning passages is connected to said chuck opening between an adjacent pair of said feed channels and communicates with the adjacent mouths of said adjacent feed channels to form an exit port for removing drilling dirt from said mouths of said adjacent channels as well as said chuck opening of said drill chuck, and wherein said cleaning passages are oriented perpendicularly to said chuck drill axis and directed toward said chuck drill axis so that centrifugal force will act to remove drilling dirt from said chuck during operation.

6. The improvement defined in claim 5 wherein each of said adjacent pair of said feed channels has one of said open cleaning passages therebetween and said feed channels and said cleaning passages have a substantially circular cross section.

7. The improvement defined in claim 6 wherein said drill chuck has three clamp jaws, three feed channels and three cleaning passages.

8. The improvement defined in claim 2 wherein a circular groove is provided about an interior wall of said chuck opening parallel to said chuck drill axis and said feed channels communicate with said groove so that said cleaning passages are connected between adjacent pairs of said feed channels to said circular groove to form an exit port therein, and said cleaning passages are oriented perpendicularly to said chuck drill axis and directed toward said chuck drill axis so that centrifugal force will act to remove drilling dirt from said chuck during operation.

9. The improvement defined in claim 8 wherein each of said adjacent pairs of said feed channels has one of said open cleaning passages therebetween and said feed channels and said cleaning passages have a substantially circular cross section.

10. The improvement defined in claim 9 wherein said drill chuck has two clamp jaws, two feed channels and two cleaning passages.

* * * * *